(12) United States Patent
Burch

(10) Patent No.: US 6,308,320 B1
(45) Date of Patent: Oct. 23, 2001

(54) METHOD AND APPARATUS FOR INCREMENTAL SELECTIVE COMPILATION OF INTERMEDIATE CODE FILES DURING COMPUTER SYSTEM COMPILATION AND LINKING

(75) Inventor: Carl D. Burch, Cupertino, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/232,398

(22) Filed: Jan. 15, 1999

(51) Int. Cl.$^7$ ........................................ G06F 9/45
(52) U.S. Cl. ................................................ 717/7
(58) Field of Search .................... 717/5, 6, 7, 9, 717/10; 709/331; 707/100

(56) References Cited

U.S. PATENT DOCUMENTS

| | | | |
|---|---|---|---|
| 5,204,960 | 4/1993 | Smith et al. | 395/700 |
| 5,230,050 | * 7/1993 | Iitsuka et al. | 395/700 |
| 5,301,327 | * 4/1994 | McKeeman et al. | 395/700 |
| 5,313,387 | * 5/1994 | McKeeman et al. | 364/400 |
| 5,325,531 | * 6/1994 | McKeeman et al. | 395/700 |
| 5,375,242 | 12/1994 | Kumar et al. | 395/700 |
| 5,586,328 | * 12/1996 | Caron et al. | 395/705 |
| 5,655,122 | 8/1997 | Wu | 395/705 |
| 5,815,720 | 9/1998 | Buzbee | 395/709 |
| 5,850,554 | 12/1998 | Carver | 395/710 |

OTHER PUBLICATIONS

Fowler et al. Principles for Writing Reusable Libraries, ACM. pp. 150–159. 1995.*

"PA Risk Compiler Optimization White Paper." Copyright Hewlett–Packard Co. 1992 (#5091–5594E). Visited Jan. 14, 1998 <http://cllweb.cup.hp.com/o>.

(List continued on next page.)

Primary Examiner—Mark R. Powell
Assistant Examiner—Wei Zhen

(57) ABSTRACT

An incremental selective compiler tool that minimizes compilation of intermediate code files by reusing object code files during the compilation and linking process. The compiler tool determines when the results of previous compilations of intermediate code files, that is object code files, may be reused in subsequent execution. That is, the incremental selective compiler tool determines whether compiler directives of an intermediate code file have changed between invocations of the linker, thereby requiring recompilation of the intermediate file to complete the linking process. The present invention also incrementally recompiles only those intermediate code files with compiler directives that have changed since the prior code generation. The incremental selective compiler tool supports arbitrary copying and movement of intermediate code files and object code files within a file system and between file systems while continuing to enable reuse of the object code files.

26 Claims, 14 Drawing Sheets

OTHER PUBLICATIONS

"PA–RISC Optimizer Trouble–Shooting Guide." Carl Burch, Copyright Hewlett–Packard Co. 1996, version 2.1.

"Compiler Optimizations For The PA–8000." Anne M. Holler, Hewlett–Packard Company.

"Profile–Based Optimization," (HP–UX–UX Linker And Libraries User's Guide, visited Nov. 18, 1998) <http://info.fc.hp.com:80/dynaweb/h . . . Generic_BookTextView/25764;uf=O#X>.

"When To Use PBO," (HP–UX Linker And Libraries User's Guide, visited Nov. 20,1998) <http://info.fc.hp.com:80/dynaweb/h . . . uen 1 a/@Generic_BookTextView/25845>.

"Using PBO With Id–r," (HP–UX Lindkr And Libraries User's Guide, visited Nov. 20, 1998) <http://info.fc.hp.com:80/dynaweb/h . . . uen 1 a/@Generic_BookTextView/27667>.

"Selecting An Optimization Level With PBO," (HP–UX Linker And Libraries User's Guide, visited Nov. 20, 1998) <http://info.fc.hp.com:80/dynaweb/h . . . uen 1 a/@Generic_Book TextView/27412>.

"Storing Profile Information For Multiple Programs, "(HP–UX Linker And Libraries User's Guide, visited Nov. 20, 1998) <http://into.fc.hp.com:80/dynaweb/h . . . Generic_Book TextView/26652;uf=0#X>.

"Forking An Instrumental Application," (HP–UX Linker And Libraries User's Guide, visited Nov. 20, 1998) <http://info.fc.hp.com:80/dynaweb/h . . . Generic_Book TextView/26892; uf=0#>.

"Using PBO To Optimize Shared Libraries," (HP–UX Linker And Libraries User's Guide, visited Nov. 20, 1998) <http://info.fc.hp.cm:80/dynaweb/h . . . uen 1 a/@Generic_Book TextView/27544>.

"Optimizing Based On Profile Data (+P/–P), " (HP–UX Linker And Libraries User's Guide, visited Nov. 20, 1998) <http://info.fc.hp.com:80/dynaweb/h . . . uen 1 a/@Generic_Book TextView/26943>.

"Linker Optimizations," (HP–UX Linker And Libraries User's Guide visited Dec. 4, 1998) <http://info.fc.hp.com:80/dynaweb/h . . . Book TextView/25332?DwebQuery=isom>.

"Using The Compiler To Link," (HP–UX Linker And Libraries User's Guide, visited Dec. 4, 1998) <http://info.fc.hp.com:80/dynaweb/h . . . _Book TextView/3313?DwebQuery=isom>.

"Instrumenting (+1/–1),"(HP–UX Linker And Libraries User's Guide, visited Dec. 4, 1998) <http://info.fc.hp.com:80/dynaweb/h . . . /26095;nh=1;uf=0?DwebQuery=i–som#X>.

"Choosing Input Data," (HP–UX Linker And Libraries User's Guide, visited Dec. 20, 1998) <http://info.fc.hp.com:80/dynaweb/h . . . Generic_Book TextView/26517;uf=0#X>.

"Sharing The Flow.data File Among Multiple Processes," (HP–UX Linker And Libraries User's Guide, visited Nov. 20, 1998) <http://info.fc.hp.com:80/dynaweb/h . . . Generic_Book TextView/26733;uf=0#X>.

"Linker Optimizations," (HP–UX Linker And Libraries User's Guide, visited Nov. 18, 1998) <http://info.fc.hp.com:80/dynaweb/h . . . uen 1 a@Generic_Book TextView/25332>.

"Improving Shared Library Start–Up Time With fastbind," (HP–UX Linker And Libraries User's Guide, visited Nov. 18, 1998) <http://info.fc.hp.com:80/dynaweb/h . . . uen 1 a/@Generic_BookTextView/28512>.

"What Happens When You Compile And Link A Program," (HP–UX Linker And Libraries User's Guide, visited Dec. 8, 1998) <http://docs.hp.com:80/dynaweb/hpux 11/dtdc . . . ric_Book TextView/1598?DwebQuery=loader#1>.

"Looking Inside A Compiler," (HP–UX Linker And Libraries User's Guide, visited Dec. 8, 1998) <http://docs.hp.com:80/dynaweb/hpux 11/dtdc . . extView/1790;nh=1;uf=0?DwebQuery=loader#X>.

"Position–Independent Code," (HP–UX Linker And Libraries User's Guide, visited Dec. 8, 1998) <http://docs.hp.com:80/dynaweb/hpux11/dtdc . . . ic_Book TextView/24622?DwebQuery=loader#1>.

"SmartBuild External Specification, Version 1.0," Carl Burch, Nathaniel Nystrom (Dec. 8, 1998). Visited Jan. 13, 1999: <http://cllweb.cup.hp.com./ll0/documents/general/smartbuild_es.html>.

"SmartBuild High–Level Design, Version 1.0," Carl Burch, Nathaniel Nystrom (Sep. 28, 1998). Visited Jan. 13, 1999: <http://cllweb.cup.hp.com./llo/documents/general/smartbuild_hld.html>.

"SmartBuild Low Level Design, Verison 1.0." Nathaniel Nystrom (Oct. 22, 1998). Visited Jan. 13, 1999: <http://cllweb.cup.hp.com./llo/documents/general/smartbuild_lld.html>.

"Performance Tuning With PA–RISC Compilers." Visited Jan. 13, 1999. <http://cllweb.cup.hp.com./ll0/documents/general/perf.tuning.html>.

"Boolean Operator." Visited Dec. 8, 1998. <http://webopedia.internet.com/Programming/Operators/Boolean_operator.html>.

Secure Hash Standard (U.S. Dept. Of Commerce/National Institute of Standards and Technology, FIPS PUB 180–1. Apr. 17, 1995.

"The MD5 Message–Digest Algorithm," Ronald L. Rivest, Network Working Group, MIT Laboratory For Computer Science and RSA Data Security, Inc. Apr. 1992 (RFC 1321).

"What Is An Object File?" (HP–UX Linker And Libraries User's Guide, visited Dec. 1, 1998) <http://into.fc.hp.com:80/dynaweb/h . . . h=1;uf=0?DwebQuery=Instrumenting#X>.

"inking Programs On HP–UX." (HP–UX Linker And Libraries User's Guide, visited Dec. 1, 1998) <http:info.fc.hp.com:80/dynaweb/h . . . /2170;nh=1?DwebQuery=Instrumenting>.

"Linking With Libraries," (HP–UX Linker And Libraries User's Guide, visited Dec. 1, 1998) <http://info.fc.hp.com:80/dynaweb/h . . . /2682;nh=1?DwebQuery=Instrumenting>.

* cited by examiner

METHOD AND APPARATUS FOR INCREMENTAL SELECTIVE COMPILATION OF INTERMEDIATE CODE FILES DURING COMPUTER SYSTEM COMPILATION AND LINKING

FIELD OF THE INVENTION

The present invention relates generally to a method and apparatus for compilers in computer systems. More particularly, the present invention relates to an incremental selective compiler tool that eliminates compilation of intermediate code files by reusing object code files during compilation and linking.

BACKGROUND OF THE INVENTION

Computer compiler systems typically employ a linker that may combine files located in different portions of the computer system, such as in the computer system memory. During linking an intermediate code file may be compiled thereby creating object code files that correspond to compiler directives associated with the intermediate code file. It will be appreciated that compiler directives may be instructions or data that affect the manner of compilation thereby determining the result of the compilation. For instance, compiler directives may be used to manage the compilation of intermediate code.

Minimizing the number of files which are compiled during the process of transforming intermediate code files into object code files and linking the object code files, reduces the computer system resources used by the compiler system. That is, the efficiency of a linker may be improved by minimizing the amount of computer resources required to complete compilation of intermediate code files and locate the resulting object code files for execution on the computer system.

Improvement in the efficiency of compiler systems has been hindered by the time expended and computer resources required by linkers to compile intermediate code files into object codes files. Therefore, there has been a need to selectively reuse object code files when portions of the intermediate code file that affect the resulting object code file, such as compiler directives, have not changed between invocations of the linker. That is, computer system linkers have not determined when object code files that resulted from previous compilations of intermediate code files may be reused. Further, typical linkers have not identified individual object code files that may be reused in subsequent invocations of the linker.

The computer resources required to manage arbitrary copying and movement of intermediate code files and object code files, within a file system and between file systems, continues to add to the overall consumption of computer resources by linkers. For instance, linkers also have not reused object code files between different file systems without relying on the location within a file system of either the object code file or of the intermediate code file.

SUMMARY OF THE INVENTION

An embodiment of the present invention includes an incremental selective compiler tool that minimizes compilation of intermediate code files by reusing object code files during the compilation and linking process. The present invention may be embodied in a compilation system of a computer system.

It will be appreciated that an intermediate code generator creates object code and when the object code is combined with one or more object code files the linker may create executable code. Also, the terms "code generator" and "intermediate code generator" will be used interchangeably herein.

An object code file may be relocated in computer memory thus allowing object code files to be compiled separately. Further, object code files may be linked together and loaded for execution by a computer system. Therefore, the present embodiment employs the linker to resolve any undefined computer location references in the object code file and to generate executable code capable of executing on the computer system. Separate compilation and linking enables flexible management of program execution.

Accordingly, it is an object of the invention to determine when the results of previous compilations of intermediate code files, that is object code files, may be reused in subsequent execution thus saving computer system resources. That is, the incremental selective compiler tool determines whether compiler directives of an intermediate code file have changed between invocations of the linker, thereby requiring recompilation of the intermediate file to complete the linking process.

Further, it is another object of the invention to incrementally recompile only those intermediate code files with compiler directives that have changed since the prior code generation. For instance, when subsequent compilation of a source code file produces an intermediate code file identical to an existing intermediate code file it is an object of the invention to eliminate unnecessary recompilation of the identical intermediate code file.

It is yet another object of the invention to support arbitrary copying and movement of intermediate code files and object code files within a file system and between file systems while continuing to enable reuse of the object code files. Therefore the present invention enables the identification of a set of reusable object code files corresponding to a given intermediate code file without relying on the location within a file system of either the object code file or of the intermediate code file.

The present invention includes an incremental selective compiler tool for reuse of object code files, therefore the present invention determines when the linking process may be completed without recompilation of an intermediate code file. The present invention advantageously incrementally determines which intermediate code files to recompile. The present invention may reuse object code files during linking of the object code files, within a file system or between file systems.

Other aspects and advantages of the present invention will become apparent from the following detailed description, taken in conjunction with the accompanying drawings, illustrating by way of example the principles of the invention.

DETAILED DESCRIPTION

Figure 1:
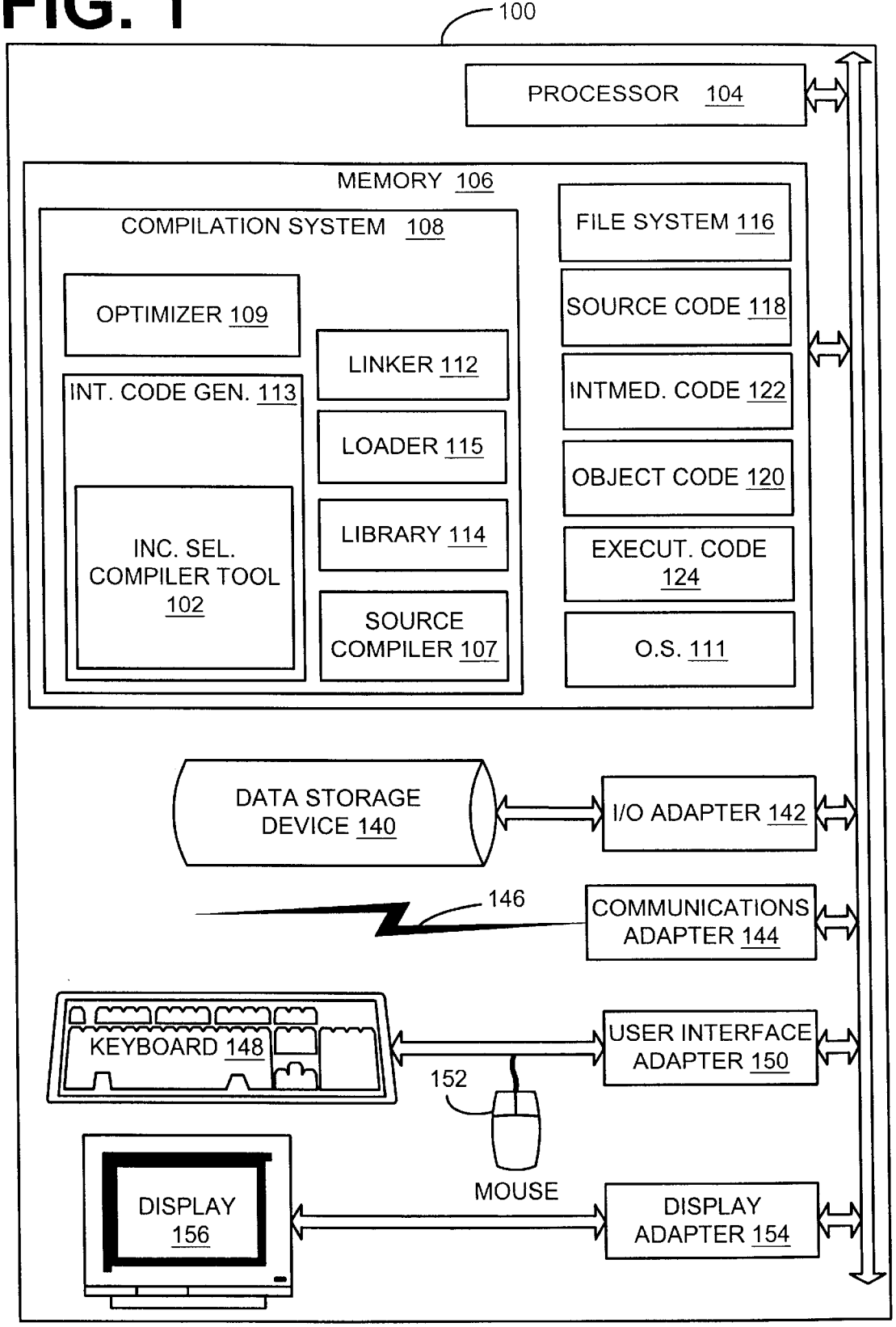
FIG. 1 is a block diagram that illustrates the computer system including the incremental selective compiler tool.

In the following detailed description and in the several figures of the drawings, like elements are identified with like reference numerals.

Broadly stated, FIG. 1 illustrates an incremental selective compiler tool 102 that is an element of a compilation system 108 and operates in a computer system 100. The compiler tool 102 enables reuse of object code files 120 resulting from the compilation of an intermediate code file 122. More particularly, the compiler tool 102 selectively compiles an intermediate code file 122 if it has changed since the prior build.

It will be appreciated that a "build" refers to the process of compilation of input files, such as source code files 118 created by the user (such as "C" software code), that generate output files, such as intermediate files 122, that are used by another element of the compilation system 108. A source compiler 107 may generate intermediate code 122 by processing source code 118. Further, the compilation of an intermediate file 122 may generate a plurality of object code files 120. For a general discussion of existing compiler, linker, and optimization technologies, see "Principles of Compiler Design," by Alfred V. Aho and Jeffrey D. Ullman (Addison-Wesley, 1977), which is herein incorporated by reference in its entirety as background information.

Further, it will be understood that an intermediate code file 122 may include instructions and data that have syntactic and semantic meaning, such as a postfix Polish string as discussed in *Aho*, (pg. 518). Those skilled in the art will appreciate Polish string notation. Further, an object code file 120 is a computer file (such as a ".o" file) that may contain instructions and data in a form that a linker 112 may use to create an executable code file 124.

An intermediate code generator 113 creates object code files 120, and when the object code files 120 are combined the linker 112 may create executable code 124. It will be appreciated that the object code files 120 may optionally be combined with one or more library code files 114 that supply features of the computer system 100 that enable execution of the executable code 124. Examples of executable files 124 include those having an extension of ".exe" operating under a Windows® operating system or an "a.out" file that may operate under a UNIX® operating system. Therefore, the present embodiment employs the linker 112 to resolve any undefined computer location references in the object code files 120 and to generate an executable code file 124 capable of executing on the computer system 100 with input/output (I/O) devices such as a keyboard 148 and a mouse 152.

By means of an example, the form of an object code file 120 may be machine language, relocatable machine-language, or assembly-language as discussed in *Aho*, (pg. 518). Object code files 120 may be initially or temporarily located in the computer system 100, and may be relocated by the linker 112 for optimal execution in the computer system 100. For instance, an object code file 120 may contain references to symbolic locations defined within the object code file 120, references to symbolic locations defined in the computer system 100 but not in the object code file 120, and relocation information that allows the linker 112 to resolve the symbolic locations with actual references in the computer system 100.

The object code files 120 may be relocated in computer memory 106 thus allowing the object code files 120 to be compiled separately. Further, object code files 120 may be linked together by the linker 112 and loaded for execution by a loader 115. Separate compilation and linking enables flexible management of program execution, such as including previously compiled object code files 120 in another execution.

It will be appreciated that "execute" refers to the process of manipulating software or firmware instructions for operation on the computer system 100. The term "code" refers to instructions or data used by the computer system 100 for the purpose of generating instructions or data that execute in the computer system 100. Further, "object code file" 120 and "object file" 120 may be used interchangeably herein. Also "intermediate code file" 122 and "intermediate file" 122 may be used interchangeably herein. "Executable code file" 124 and "executable file" 124 may be used interchangeably herein. "Source code file" 118 and "source file" 118 may be used interchangeably herein. Also, the terms "procedure," and "function" will be used interchangeably herein. Further, the term "module" refers to a combination of procedures or functions that are treated as one unit by the computer system 100.

The present embodiment includes an optimizer 109 that generates object code 120 that includes optimization changes which may be dependent on a particular computer system 100. Further, these system-specific changes allow the optimizer 109 to generate object code 120 that is highly tailored to optimally run on a specific computer system 100. For example, code may be tailored to support different cache organizations or a different number of computer processors. Further, the optimizer 109 may make iterative changes to enhance further processing by the optimizer 109. In the present embodiment the linker 112 may operate on the object code 120 generated by the optimizer 109.

The executable file 124 is created to operate on a particular computer system 100 and contains information used to load and execute a program. The term "program" refers one or more procedures or files of code that are associated with each other for the purpose of executing as one unit on a computer system 100. As will be appreciated by those skilled in the art, information such as whether the executable file 124 is shared between other executable files 124 or uses libraries 114, may be included in the executable file 124. The executable file 124 may be executed by a loader 115, which operates to resolve any system-specific information such as address locations that are necessary to execute the executable file 124. For instance, the loader 115 may resolve address locations for libraries 114 used in the executable file 124 or may determine where to begin execution of the executable file 124. More particularly, the loader 115 works with an operating system (O.S.) 111 to determine the location in the memory 106 at which the executable file 124 may execute, and the loader 115 inserts the executable file 124 into the memory 106 at the appropriate location.

The compiler tool 102 includes instructions and data that may be referred to as values such as integer, real, or complex numbers; or characters. Alternatively, the values may be pointers that reference values. Therefore, a pointer provides direction to locate a referenced value. A combination of characters may be referred to as a "string."

More particularly, the instructions may be operating instructions of the computer system 100 or addresses. The addresses may be actual computer addresses or virtual, symbolic addresses that represent actual computer addresses. For instance, an actual computer address may be a computer hardware register (not shown) or a location in the memory 106. It will be appreciated that the terms "virtual address" and "symbolic address" may be used interchangeably herein. The virtual address is a pointer to the actual address. The instructions and data are herein referred to as "instructions."

FIG. 1 further represents the computer system 100 that includes components such as the processor 104, the memory 106, a data storage device 140, an I/O adapter 142, a communications adapter 144, a communications network 146, a user interface adapter 150, the keyboard 148, the mouse 152, a display adapter 154, and a computer monitor 156. It will be understood by those skilled in the relevant art that there are many possible configurations of the components of the computer system 100 and that some components that may typically be included in the computer system 100 are not shown.

It will be understood by those skilled in the art that the functions ascribed to the compiler tool 102, or any of its functional files, typically are performed by the central processing unit that is embodied in FIG. 1 as the processor 104 executing such software instructions.

The processor 104 typically operates in cooperation with other software programs such as the O.S. 111 and those included in the compilation system 108 including the compiler tool 102. Henceforth, the fact of such cooperation among the processor 104 and the compiler tool 102, whether implemented in software, hardware, firmware, or any combination thereof, may therefore not be repeated or further described, but will be implied. The O.S. 111 may cooperate with a file system 116 that manages the storage and access of files within the computer system 100. The interaction between the file system 116 and the O.S. 111 will be appreciated by those skilled in the art.

It will also be understood by those skilled in the relevant art that the functions ascribed to the compiler tool 102 and its functional files, whether implemented in software, hardware, firmware, or any combination thereof, may in some embodiments be included in the functions of the O.S. 111. That is, the O.S. 111 may include files from the compiler tool 102. In such embodiments, the functions ascribed to the compiler tool 102 typically are performed by the processor 104 executing such software instructions in cooperation with aspects of the O.S. 111 that incorporate the compiler tool 102. Therefore, in such embodiments, cooperation by the compiler tool 102 with aspects of the O.S. 111 will not be stated, but will be understood to be implied.

Computer memory 106 may be any of a variety of known memory storage devices or future memory devices, including any commonly available random access memory (RAM), cache memory, magnetic medium such as a resident hard disk, or other memory storage devices. In one embodiment the O.S. 111 and the compiler tool 102 may reside in the memory 106 during execution in the computer system 100.

Source code 118, intermediate code 122, object code 120, and executable code 124 may all reside in the memory 106 when the compiler tool 102 is operating under the control of the O.S. 111. The compilation system 108 and the O.S. 111, may also reside in the memory 106 when the compiler tool 102 is operating under the control of the O.S. 111. It will be appreciated that the compilation system 108 may include the following elements that enable the generation of executable code 124 that is capable of executing on the computer system 100. The compilation system 108 may include the optimizer 109, the intermediate code generator 113 including the compiler tool 102, the linker 112, the loader 115, the libraries 114, and the source compiler 107.

The compiler tool 102 may be implemented in the "C" programming language, although it will be understood by those skilled in the relevant art that other programming languages could be used. Also, the compiler tool 102 may be implemented in any combination of software, hardware, or firmware.

The data storage device 140 may be any of a variety of known or future devices, including a compact disk drive, a tape drive, a removable hard disk drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example the keyboard 148, the mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154. Input/output devices could also include any of a variety of known data storage devices 140 including a compact disk drive, a tape drive, a removable hard disk drive, or a diskette drive.

By way of illustration, the executable code 124 may typically be loaded through an input device and may be stored on the data storage device 140. A copy of the executable code 124 or portions of it, may alternatively be placed by the processor 104 into the memory 106 for faster execution on the computer system 100.

The computer system 100 may communicate with a network 146 through a communications adapter 144. The network 146 may be a local area network, a wide area network, or another known computer network or future computer network. It will be appreciated that the I/O device used by the compiler tool 102 may be connected to the network 146 through the communications adapter 146 and therefore may not be co-located with the computer system 100. It will be further appreciated that other portions of the computer system, such as the data storage device 140 and the monitor 156, may be connected to the network 146 through the communications adapter 144 and may not be co-located.

Figure 2:
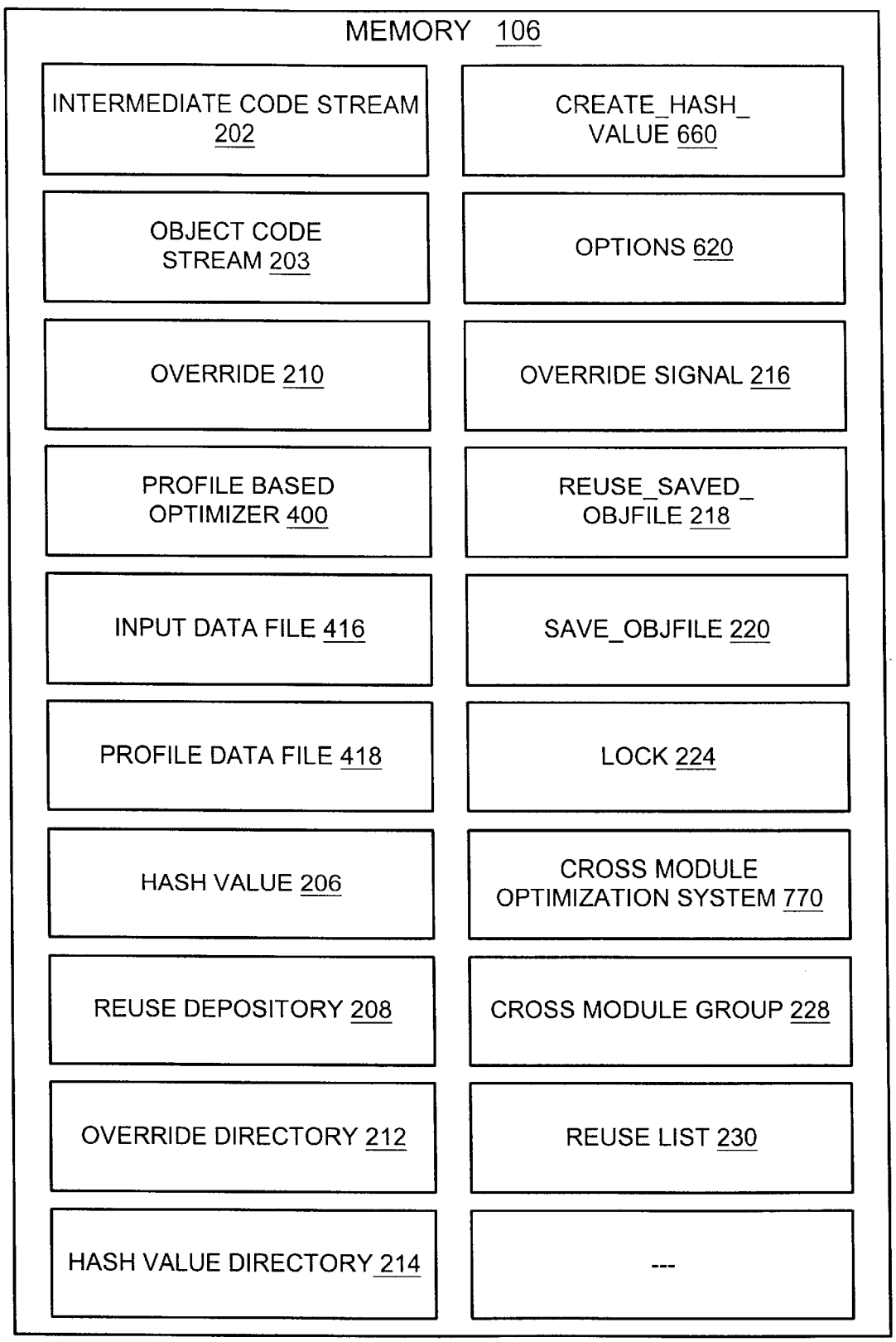
FIG. 2 is a block diagram of the memory that includes data structures used by the compiler tool.

FIG. 2 illustrates data structures and functions used by the compiler tool 102 and that may be stored in the memory 106. The data structures and functions are listed in the general order of discussion with reference to the figures. The memory 106 may include the following:

an intermediate code stream 202 that is one or more instructions that represent compiler directives;

an object code stream 203 that is one or more instructions that represent compiler directives and that may be included in the object code file 120;

an override instruction 210 that is included in the intermediate code stream 202 and that alters the intermediate code stream 202;

a profile based optimizer 400 that instruments intermediate code 122 and performs code repositioning prior to execution, based on profile information gathered by running the instrumented intermediate code 122 against a representative input data file 416;

the input data file 416 contains representative data for typical program execution;

a profile data file 418 that includes profile data used by the profile based optimizer 400 to optimize and reposition code during a subsequent compilation;

a hash value 206 that represents the intermediate code stream 202;

a reuse depository 208 that is a directory containing the compiled object files 120 that will be reused;

an override directory 212 that is named by the combination of override instructions 210 corresponding to a particular mode of compilation;

a hash directory 214 whose name is a derivative of the hash value 206;

a create_hash_value function 660 that creates a hash value 206 for use in building the intermediate file 122 and the object file 120;

an option file 620 that is the list of overrides 210 and is stored in the override directory 212;

an override signal variable 216 that contains the list of overrides 210 for an invocation of the intermediate code generator 113 and may be a pointer to the option file 620;

a reuse_saved_objfile function 218 that reuses an object file 120;

a save_objfile function 220 that is used to save the object file 120 for reuse by the compiler tool 102;

a lock file 224 that ensures that the intermediate code generator 113 will only create the object file 120 in one build process at a time;

a cross module optimization system 770 that treats intermediate files 122 as a unit;

a cross module group 228 that is a collection of intermediate files 122;

a reuse list 230 that is maintained to facilitate the management of the compiler tool 102 for cross module groups 228;

as well as other data structures and functions.

Figure 3A:
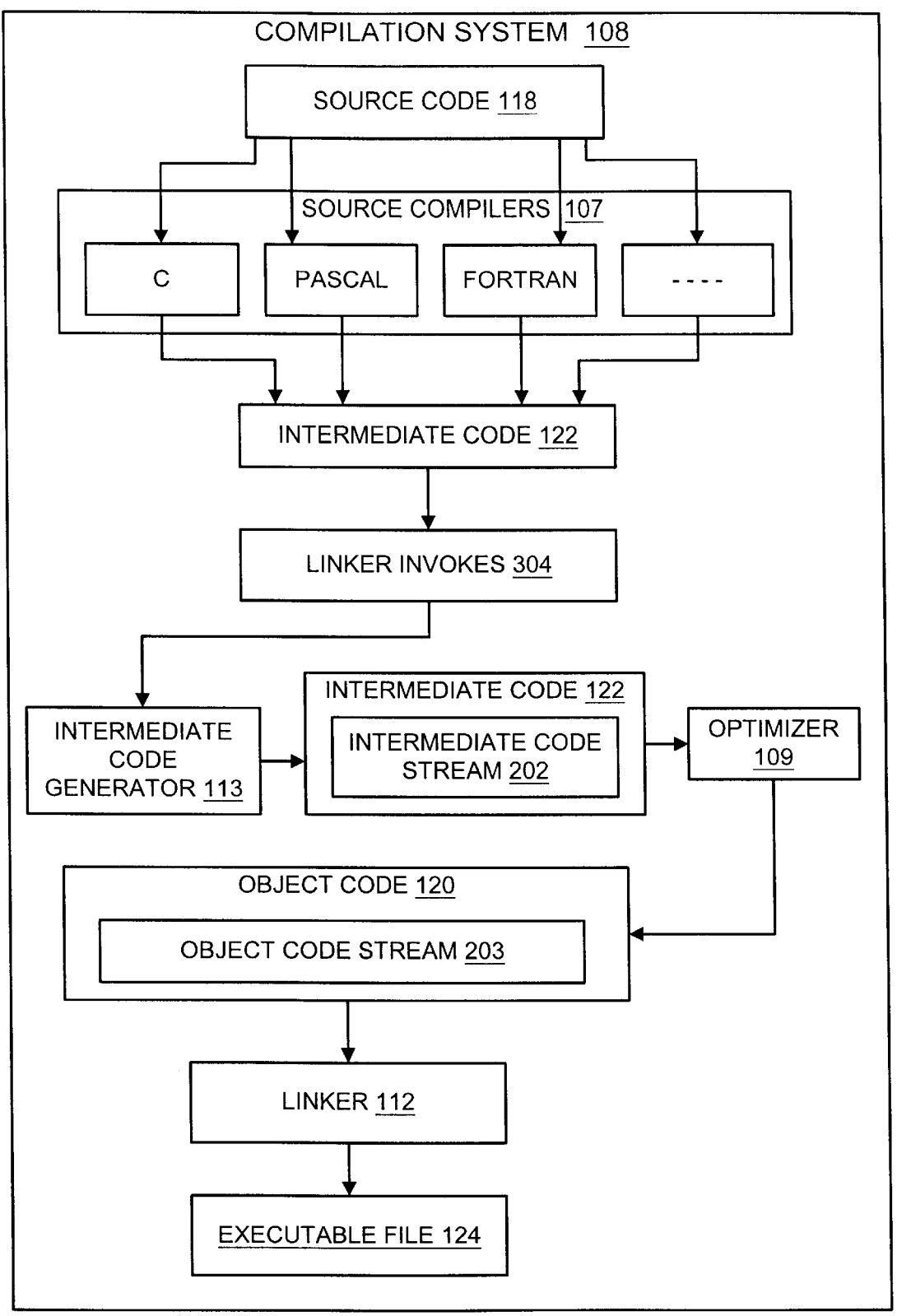
FIG. 3A is a flow diagram that illustrates portions of the compilation system.

FIG. 3A illustrates portions of the operation of the compilation system 108. A user creates source code 118 that may be written in any of a variety of known specific programming languages, such as the "C," Pascal, or FORTRAN languages, or future languages. A source compiler 107 processes a source code file 118 and thereby transforms the source code file 118 into an intermediate code file 122.

As shown in element 304, the linker 112 invokes an the intermediate code generator 113 that operates on the intermediate code file 122, which may include an intermediate code stream 202. The intermediate code stream 202 is an instruction, in a system-specific language, that represents information produced by the compilation of the source file 118 including compilation options and compiler directives the user may specify during the invocation of the source compiler 107. Typically additional information may be added to the intermediate code stream 202 to enable generation of a specific executable file 124 that is tailored to execute in a particular fashion, such as to enhance execution performance characteristics. It is also possible to alter the intermediate code stream 202, and an addition or alteration to the intermediate code stream 202 is referred to as an override instruction 210 (as shown in FIG. 2). The presence of an override instruction 210 in the intermediate code file 122 implies that the compilation system 108 has altered the intermediate code stream 202, thus overriding the original intermediate code stream 202 generated with the user provided source code 118. Every combination of override instructions 210 changes the output of the intermediate code generator 113 and therefore may generate a different set of object code files 120 from the same intermediate code file 122.

The optimizer 109 may optionally operate on the intermediate code file 113 to enhance the resulting object code file 120 for the purpose of producing an executable file 124 that executes efficiently. The object code file 120 may preserve the execution instructions included in the intermediate code file 122 by including execution instructions in the object code stream 203. The linker 112 subsequently generates an executable file 124 by linking the associated object code files 120 and other files such as libraries 114 (as shown in FIG. 1).

Figure 3B:
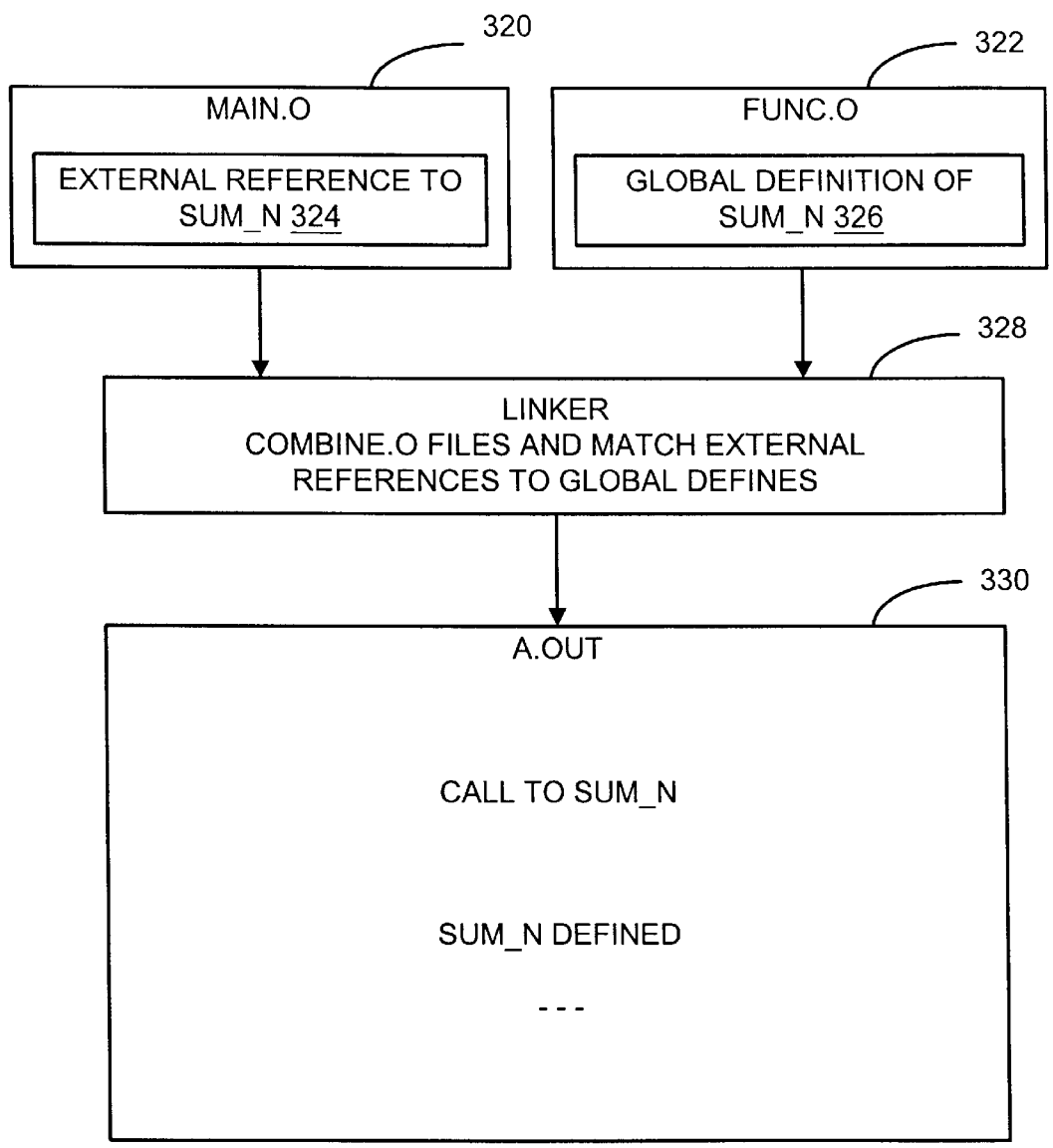
FIG. 3B is a flow diagram that is an example of the operation of the linker.

As shown in FIG. 3B by means of example, the linker 112 may combine object files 120 such as main.o 320 and func.o 322, as shown in element 328. For example, the file main.o 320 may include a reference to a sum_n function that is not included within the body of main.o 320, and func.o 322 may include a definition of the sum_n function that may be globally defined within the memory 106. After the operation of the linker 112 to combine the appropriate object code files 120 as shown in element 328, the reference to sum_n function and the definition of sum_n function are both included in the resulting executable code file 124, a.out, as shown in element 330.

Figure 4:
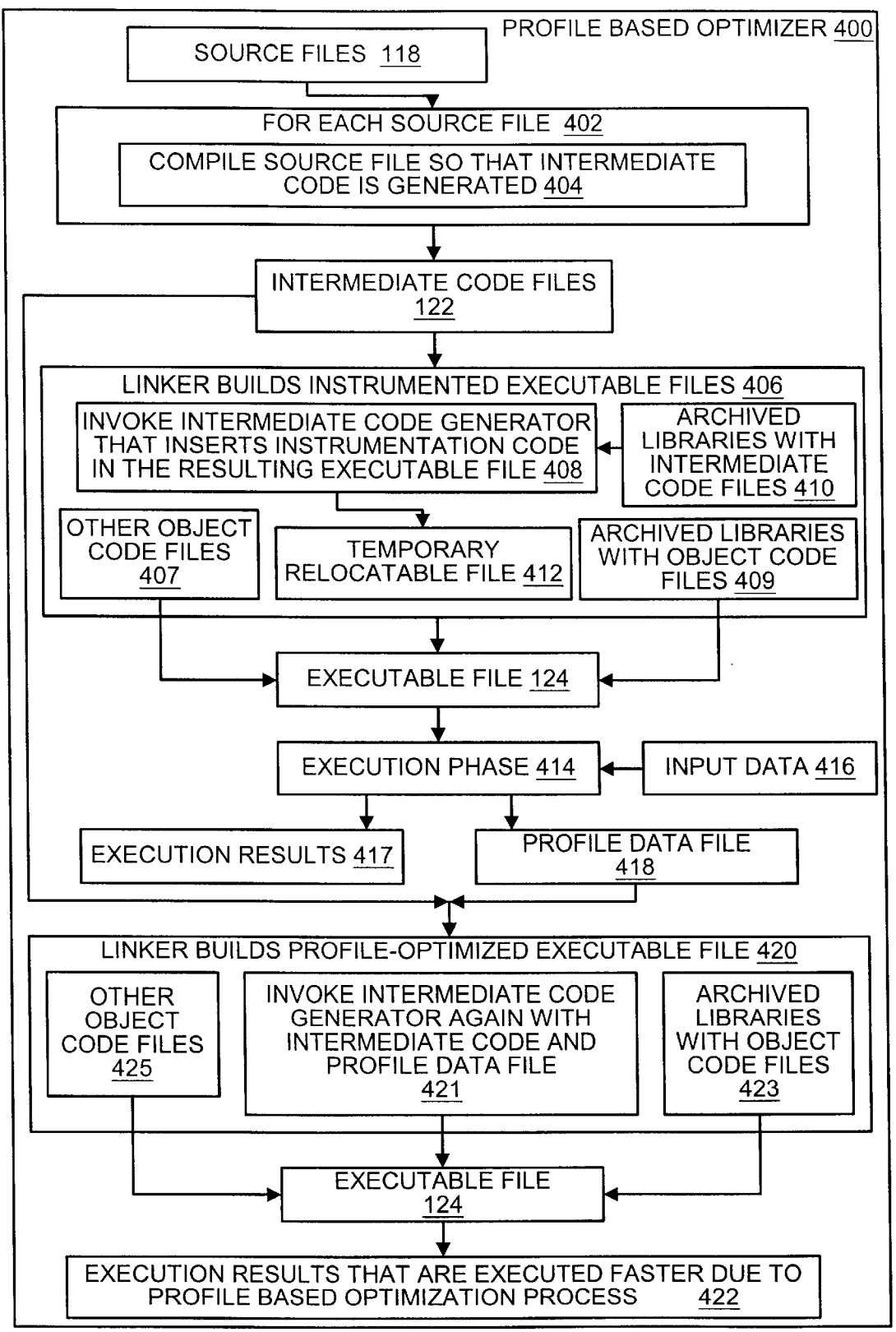
FIG. 4 is a flow diagram that illustrates a profile based optimizer that exemplifies an application of the compilation tool.

As shown in FIG. 4, a profile based optimizer 400 will be used to exemplify an application of the compiler tool 102 (as shown in FIG. 1). The profile based optimizer 400 instruments intermediate code 122, and subsequently performs code repositioning prior to execution, based on profile information gathered by previously executing the intermediate code 122 against a representative input data file 416. The effect of such repositioning optimization is to reduce branch and instruction cache miss penalties. Those skilled in the art will appreciate the benefit of reducing such penalties during execution.

It will be appreciated that "instrument" and "instrumentation" refer to the process of gathering measurement data while a computer system is executing for the purpose of understanding computer system behavior. Instrumented software includes measurement instructions that have been inserted into software code at specific places for the purpose of measuring operations in the executing computer system 100 (as shown in FIG. 1). By way of example, instrumented software code may be used to determine the time required to execute a block of software code, to identify the number of times a certain operation is executed, or to determine the code path used to enter and exit a block of software code.

The repositioning of procedures by the profile based optimizer 400 occurs at link time, and basic block repositioning is performed in the optimizer 109 (as shown in FIG. 1). It will be appreciated that a basic block of code is a sequence of code with a single entry point and single exit point. One type of user application that will benefit from the profile based optimizer 400 is an application that exhibits poor instruction memory locality, such as large applications in which the most common paths of execution are spread across multiple compilation units. Also applications that are branch-intensive may benefit from profile based optimization. That is, the operations performed in such applications are highly dependent on input data such as user interface managers, database managers, editors, and compilers and may therefore benefit from optimization that incorporates representative data in the optimization process.

Each source file 118 that will be used in the compilation process is processed as shown in element 402. In element 404 each source file 118 is compiled so that intermediate code 118 is generated. The intermediate files 118 are built by the linker 112 with instrumentation code as shown in element 406. For instance, if a source code file 118 included the following instruction, "A+2=B" and A=8, then after processing the instruction, B equals 10. In the present embodiment, the linker 112 in element 406 builds the instrumented executable code files 124 that represent "A+2= B."

The intermediate code generator 113 (as shown in FIG. 1) inserts instrumentation code in the resulting executable file 124, as shown in element 408. Additionally, archived libraries 410 may be inserted into the code that is built by the code generator. The resulting temporary relocatable files 412 are transformed into executable files 124. Additionally, any other object code files 120 as shown in element 407, and archived libraries with object code files 120 as shown in element 409 are included in the process of creating the executable files 124.

During the execution phase input data 416 is provided, and in our example particular values for A are used to generate a profile data file as shown in element 418. The profile data file 418 includes data that is used by the profile based optimizer 400 to instrument and reposition code during a subsequent compilation. The first execution in our example results in B=10 as shown in element 417. It will be appreciated that input data 416 should be representative of typical data used for execution. This will ensure that the optimization effects are applied to typical usage scenarios of the executable file 124.

Now that a profile data file 418 has been created that corresponds to the intermediate code file 122 and the input data 416, the linker 112 builds a profile optimized executable file 124 as shown in element 420. The intermediate code generator 113 is again invoked as shown in element 421. The intermediate code generator 113 transforms the intermediate file 122 with the profile data file 418 to produce another executable file 124 and subsequently execution results as shown in element 422. Additionally, any other object code files 120 as shown in element 425, and archived libraries with object code files 120 as shown in element 423 are included in the process of creating the executable files 124. The second execution in our example will also result in B=10 but will, by virtue of the use of the profile data file 418, execute quicker than the first execution as shown in element 422.

The profile based optimizer 400 may be enhanced by the use of the compiler tool 102 that selectively recompiles only those intermediate code files 122 that have changed during the execution as shown in element 420.

Figure 5:
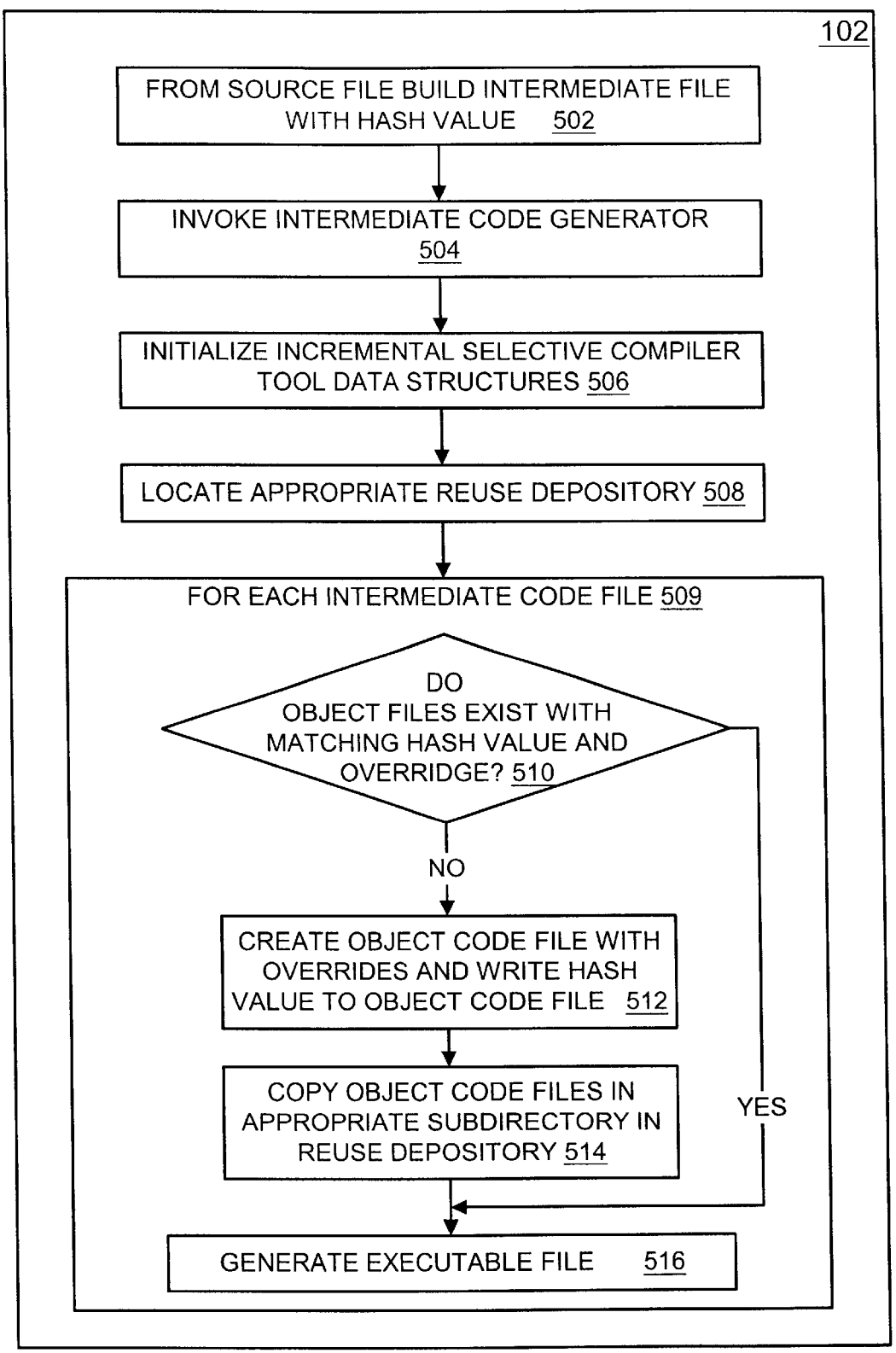
FIG. 5 is a flow diagram that illustrates the basic operation of the incremental selective compiler tool.

A flow chart as shown in FIG. 5 illustrates the basic operation of the compiler tool 102. A more detailed flow chart illustrating the operation of the compiler tool 102 will be described with respect to FIG. 7A. In the embodiment, the compiler tool 102 builds intermediate files 122 with a hash value 206 that represents the intermediate code stream 202, as shown in element 502. The hash value 206 may be created by invocation of the create_hash_value function 660 as described with respect to FIG. 6C that creates a hash value 206 for use in building the intermediate file 122 and the object file 120. The hash value 206 and intermediate code stream 202 are shown in FIG. 2. It will be appreciated that the term "hash" may also be used to identify the process of creating the hash value 206.

The compiler tool 102 supports copying and movement of intermediate files 122 and of a reuse depository 208. Therefore the compiler tool 102 may identify the set of reusable object files 120 corresponding to a given intermediate file 122 without relying on the location of either the object file 120 or of the intermediate file 122 within the file system 116 (as are shown in FIG. 1). A reuse depository 208 is a directory that contains the compiled object files 120 that will be reused. Therefore, a source file 118 may be compiled with the appropriate compilation options including a directory path name of the reuse depository 208 that is passed to the linker 112. Further, the linker 112 passes the directory path name of the reuse depository 208 to the intermediate code generator 113 (as shown in FIG. 1). The terms "path name," "directory," and "directory path name" refer to labels used in the file system 116 to reference specific locations, whether actual or virtual, of files within the file system 116. It will be appreciated that use of the term "reuse depository" herein will refer to the directory path name for the "reuse depository."

In order to identify object files 120 corresponding to a given intermediate file 122, the intermediate code stream 202 is transformed into a secure hash value 206 that is recorded in both the intermediate code file 122 and the corresponding object code files 120. The secure hash value 206 is derived from the intermediate code stream 202 that reflects the compilation options and compiler directives. Additionally, override instructions 210, which are discussed with reference to FIG. 6B may be used to derive the secure hash value 206. The intermediate code stream 202 plus the override instructions 210 uniquely determine a particular object code file 120 generated from the intermediate code file 122. Therefore the hash value 206 derived from the intermediate code stream 202 and the override instructions 210, is sufficient to identify the intermediate code file 122.

A collision of hash values 206 corresponding to two intermediate code streams 202 could result in a false positive identification of the correspondence between an intermediate code file 122 and an object code file 120. Therefore, it is extremely important that the hash value 206 is effectively collision-free. Collision-free refers to the attribute that it is infeasible to find two random sets of characters that generate the same hash value 206. Therefore, those skilled in the art will appreciate that the present embodiment generates a hash value 206 of two hundred eighty-eight bits to ensure a collision-free hash value 206.

By way of example, the National Institute of Standards and Technology (NIST) has developed a secure hash value 206 as discussed in the NIST FIPS Pub. 180–1, "Secure Hash Standard," U.S. Department of Commerce, April, 1995, which is herein incorporated by reference in its entirety as background information. Also, Ronald Rivest has developed a secure hash value 206 as discussed in, "The MD5 Message-Digest Algorithm," Request For Comments 1321, MIT Laboratory for Computer Science and RSA Data Security, Inc., April, 1992, which is herein incorporated by reference in its entirety as background information. The present embodiment applies the National Institute of Standards and Technology hash procedure to the intermediate code stream 202 and subsequently applies the MD5 hash procedure to the same intermediate code stream 202 to obtain a second independent hash value 206. The serial use of two independent hash values 206 ensures an effectively collision-free decision.

It will be appreciated by those skilled in the art, that some portions of the intermediate code stream 202 have no semantic value, and therefore may not be incorporated into the hash value 206. For example, the intermediate code stream 202 corresponding to the following code instructions may not be included in the hash value: source code title, copyright notice, compiler version, assembler file name, and user version.

Continuing to refer to FIG. 5, the intermediate code generator 113 is invoked, as shown in element 504. Further, when the compiler tool 102 is operating, data structures used by the compiler tool 102 are initialized, as shown in element 506. The compiler tool 102 will access the appropriate reuse depository 208 by use of the reuse depository path name passed to the linker 112, as shown in element 508. Therefore, if the reuse depository 208 exists, the intermediate code generator 113 will attempt to reuse object files 120 deposited there. If the reuse depository 208 does not exist the intermediate code generator 113 will try to create it, and if the reuse depository 208 cannot be created, the intermediate code generator 113 will issue a warning and then recompile the intermediate files 122 without reusing the associated object files 120. A failure in the reuse depository 208 such as file permission collisions or lack of disk space will be reported.

As shown in element 509, each intermediate code file 122 will be processed. As shown in element 510, the compiler tool 102 will determine whether the object files 120 in the reuse depository 208 contain hash values 206 that match the hash value 206 and the override instructions 210 of the corresponding intermediate file 122. It will be appreciated that the appropriate object files 120 will be located via a series of sub-directories that may include an override directory 622 as discussed with reference to FIG. 6B. If a match is found, then the object files 120 will be reused and the executable file 124 will be generated from the object files 120 as shown in element 516.

Alternatively as shown in element 512, if a match is not found the compiler tool 102 will create object code files 120 from the intermediate file 122 using the appropriate override instructions 210. Further the compiler tool 102 will write the hash value 206 from the intermediate file 122 to the corresponding object files 120. Subsequently, the compiler tool 102 will deposit the object code files 120 in the appropriate sub-directory in the reuse depository 208, as shown in element 514. Then, the compiler tool 102 will generate executable files 124 from the object files 120, as shown in element 516.

Figure 6A:
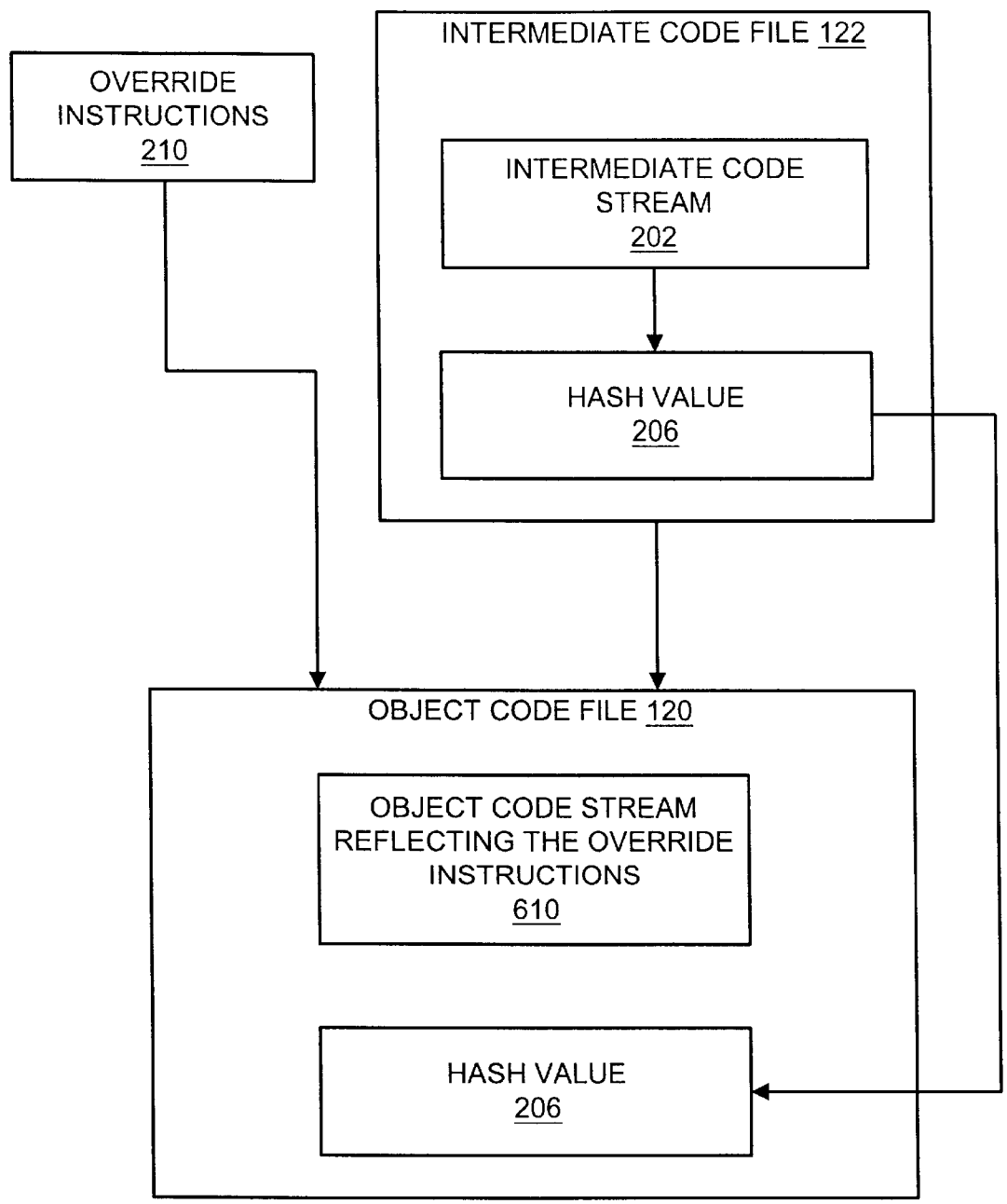
FIG. 6A is a block diagram that illustrates the intermediate code file and the object code file.

FIG. 6A is a block diagram that illustrates the intermediate code file 122 and the object code file 120. The intermediate code file 122 may include the intermediate code stream 202 and the hash value 206 that is abstracted from and represents the intermediate code stream 202. When the object code file 120 is created the hash value 206 is abstracted from the intermediate code stream 202 and inserted into the object file 120. The object file 120 includes the object code stream 203 reflecting the override instructions 210 as shown in element 610.

Figure 6B:
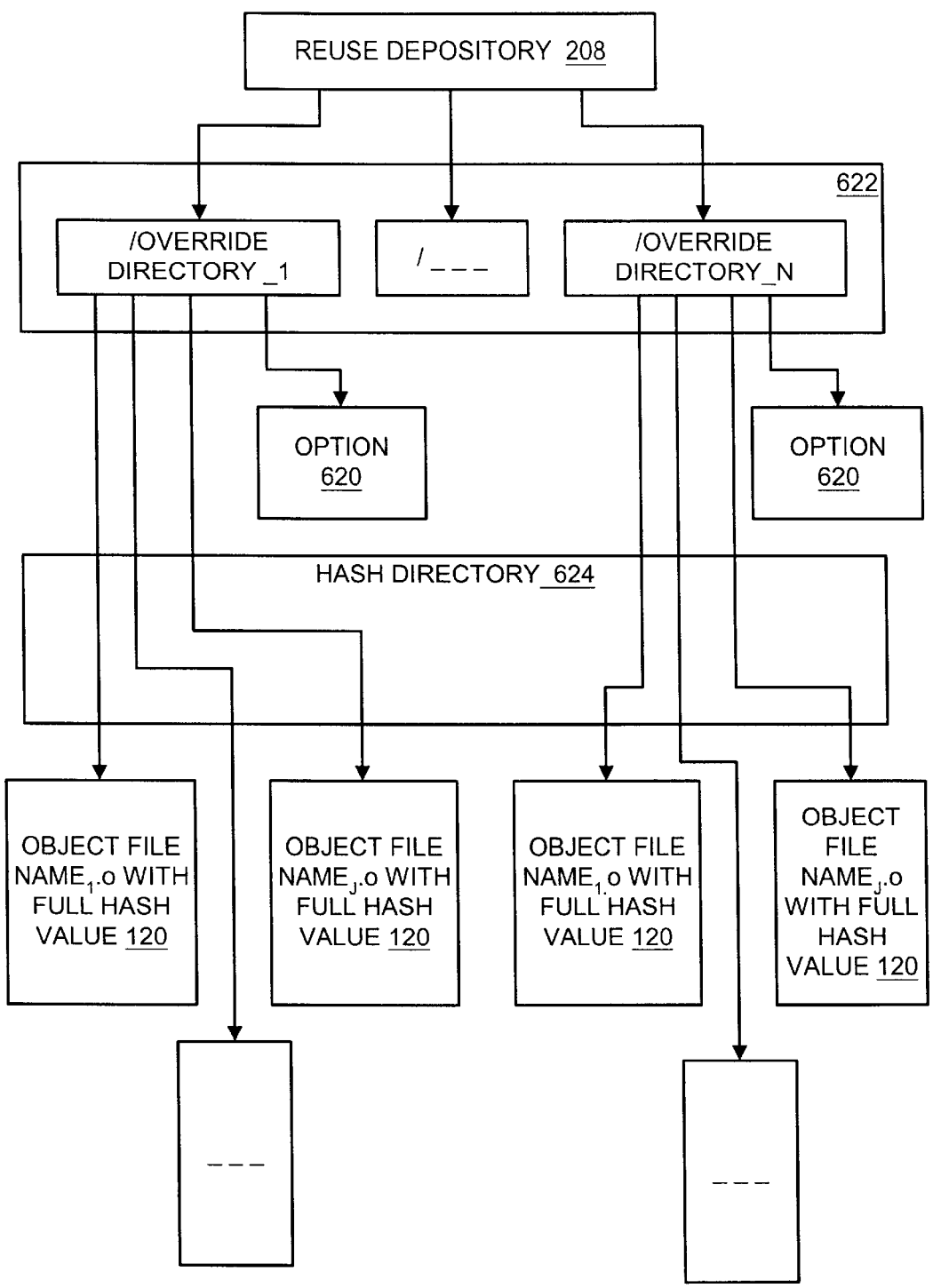
FIG. 6B is a block diagram that illustrates the reuse depository.

FIG. 6B is a block diagram that illustrates the reuse depository 208, a directory containing the compiled object files 120, which may be reused. Recall that the path name to the root directory of the reuse depository 208 is passed to the linker 112. It will be appreciated by those skilled in the art that the root directory is the initial directory of the current file system 116. As discussed with respect to FIG. 5, if the reuse depository 208 already exists the intermediate code generator 113 (as shown in FIG. 1) will attempt to reuse object files 120 deposited in the reuse depository 208. When the reuse depository 208 does not exist, the intermediate code generator 113 will try to create it. If the reuse depository 208 cannot be created the intermediate code generator 113 will issue a warning and proceed to recompile the intermediate files 122.

Returning to FIG. 6B, the reuse depository 208 is a set of sub-directories corresponding to each combination of override instructions 210 (as shown in FIG. 2) passed to the intermediate code generator 113. Within each sub-directory the object files 120 that correspond to the combination of override instructions 210 and the intermediate code stream 202 (as shown in FIG. 2) of the intermediate files 122 (as shown in FIG. 1) are stored. The combination of override instructions 210 for a given sub-directory will be encoded in an override directory 212 name, as shown in element 622. Since the override directory 212 name may not be sufficiently long to hold the complete list of override instructions 210, the list of override instructions 210 is stored in the option file 620 in the override directory 212. Further in the embodiment and as shown in element 624, the hash value 206 is hashed again until a fourteen character hash value 206 is created that is used to label the hash directory 214. Therefore, the hash directory 214 is a sub-directory of the override directory 212.

In the present embodiment, the original location of the object code files 120 in the file system 116 (as shown in FIG. 1) is related to conventional compilation of the intermediate code files 122, and is associated with their position in the reuse depository 208. Therefore, the compiler tool 102 maintains correspondence between the original location of the object code files 120 and their position in the reuse depository 208. If the reuse depository 208 is located on another file system 116, the object file 120 will first be copied to a temporary file (not shown) on the file system 116 hosting the reuse depository 208. Subsequently, the object file 120 will be linked to the appropriate override directory 212 in the reuse depository 208, thus ensuring that the link or copy of the object file 120 is an atomic operation. It will be appreciated that an atomic linking operation ensures that two simultaneous builds of the same type and same file will not overwrite their respective results.

In the present embodiment the reuse depository 208 is not self-cleaning. Once an object file 120 is stored in the reuse depository 208, the compiler tool 102 will not remove it.

This allows multiple versions of an object file 120 to be derived from the same source file 118 (as shown in FIG. 1) and saved for reuse.

Figure 6C:
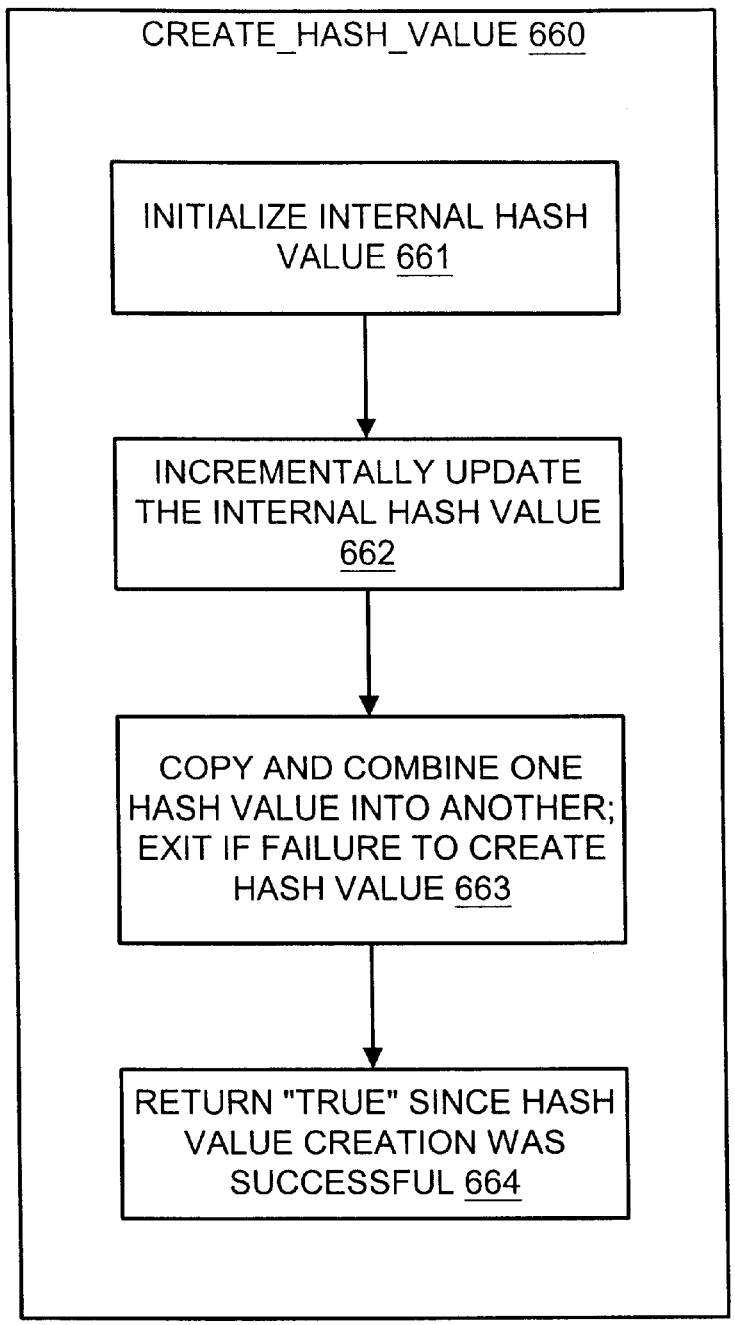
FIG. 6C is a flow chart that illustrates the create_hash_value function.

As shown in FIG. 6C (and as discussed with reference to FIG. 5) the create_hash_value function 660 creates a hash value 206 for use in building the intermediate file 122 and the object file 120. The hash value 206 is internally initialized as shown in element 661. Thereafter, the hash value 206 is incrementally updated as shown in element 662 by accessing the intermediate code stream 202. During the creation of the hash value 206 and to ensure the creation of a collision-free hash value 206, one hash value 206 may be copied and combined into another as shown in element 663. Further, as shown in element 663, if the creation of the hash value 206 failed, the create_hash_value function 660 is exited.

If the create_hash_value function 660 is not exited as shown in element 663, but completes normally, as shown in element 664, a "TRUE" is returned from the create_hash_value function 660.

The present embodiment advantageously applies hash procedures to improve link execution speed by creating a virtually unique identifier for the path name directory of the reuse depository 208. Secure hash functions make a probability of hash collisions extremely low. Thus, the present embodiment locates and fully qualifies the object file 120 without dependence on the path name of the reuse depository 208. Therefore the reuse depository 208 can be moved or copied to another location, including another file system 116 and the object files 120 (as are shown in FIG. 1) may be reused from the new location by compiling with the appropriate reuse depository 208 directory name. It will be appreciated that the path name for the object file 120 in the reuse depository 208 may be made unique by another method than is herein represented without departing from the scope of the invention.

In the present embodiment the hash process includes use of the "XOR" instruction. It will be appreciated that the "XOR" instruction operates an exclusive OR instruction on two values. That is, only when one of two values is "TRUE," will the results of the XOR operation be "TRUE." Therefore, if both of the values are "TRUE," then the results of the XOR operation will be "FALSE." As compared to an "AND" instruction or an "OR" instruction, the "XOR" instruction will generate the appropriate number of "TRUE" and FALSE" results to ensure a collision-free hash. That is, an "AND" instruction may generate too many "FALSE" results to create a collision-free hash. Alternatively, an "OR" instruction may generate too many "TRUE" results to create a collision-free hash. Those skilled in the art will appreciate the advantageous results of applying an "XOR" instruction for generation of collision-free hash results.

By means of example, if "FIRSTVALUE=TRUE" and "SECONDVALUE=FALSE" then the result of the "XOR" operation on FIRSTVALUE and SECONDVALUE is "TRUE." However, if "FIRSTVALUE=TRUE" and SECONDVALUE=TRUE" then the result of the "XOR" operation on FIRSTVALUE and SECONDVALUE is "FALSE." Alternatively, if "FIRSTVALUE=FALSE" and SECONDVALUE=FALSE" then the result of the "XOR" operation on FIRSTVALUE and SECONDVALUE is "FALSE."

Figure 6D:
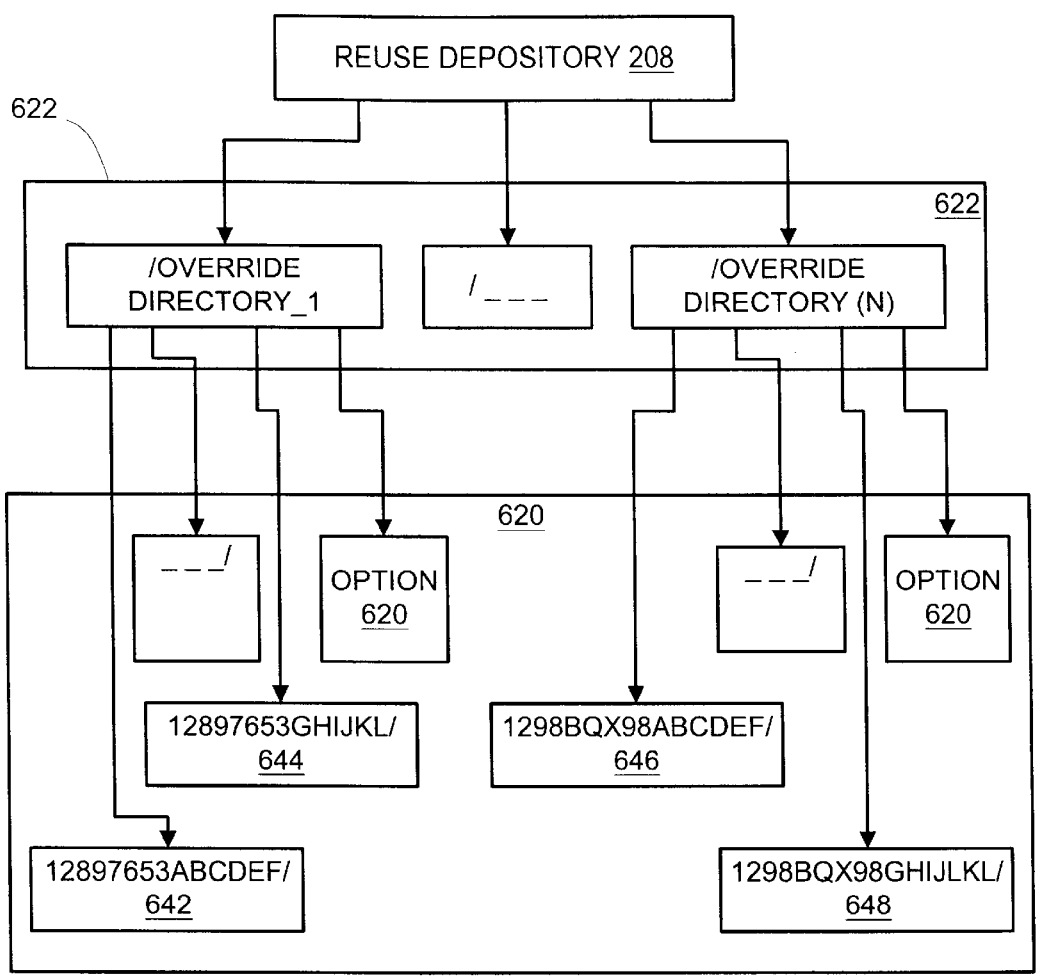
FIG. 6D is a block diagram that is an example of the reuse depository.
Figure 6D:
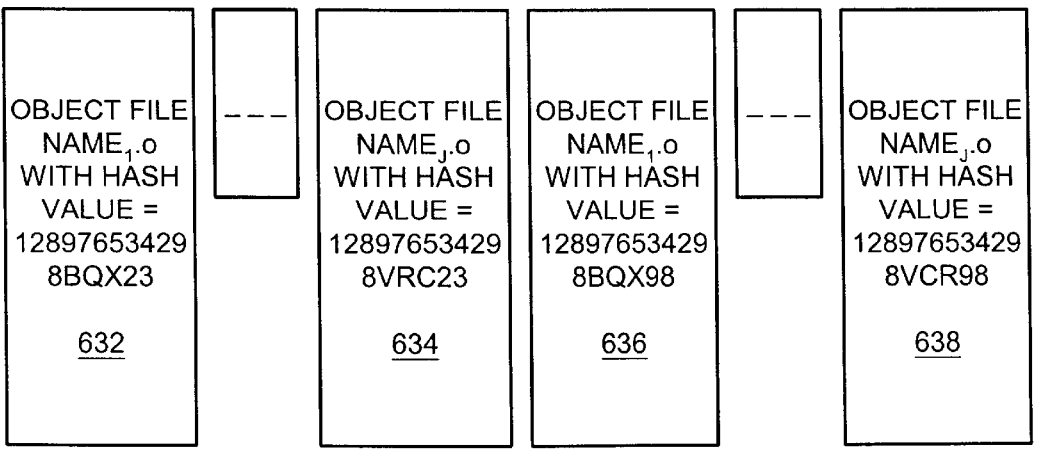

More particularly by way of example and as shown in FIG. 6D, the reuse depository 208 may include an override directory 212 as shown in element 622, that is a combination of the override instructions 210. The hash value 206 contained in the object file 120 having more than fourteen characters is shown in element 632 as "/128976534298BQX23," in element 634 as "/128976534298VRC23," in element 636 as "/128976534298BQX98," and in element 638 as "128976534298VCR98." When the hash procedure is applied to the hash value 206 the resulting fourteen digit value becomes the name of the hash directory 214 as shown in element 642 as "/12897653ABCDEF," element 644 as "/12897653GHIJKL," element 646 as "/1298BQX98ABCDEF," and element 648 as "/298BQX98GHIJKL." It will be appreciated that the creation of a fourteen character name of the hash directory 214 will facilitate the operation of the compiler tool 102 on a file system 116 (as are shown in FIG. 1) that supports only short file names. Those skilled in the art will appreciate the use of short file names in the file system 116.

Figure 7A:
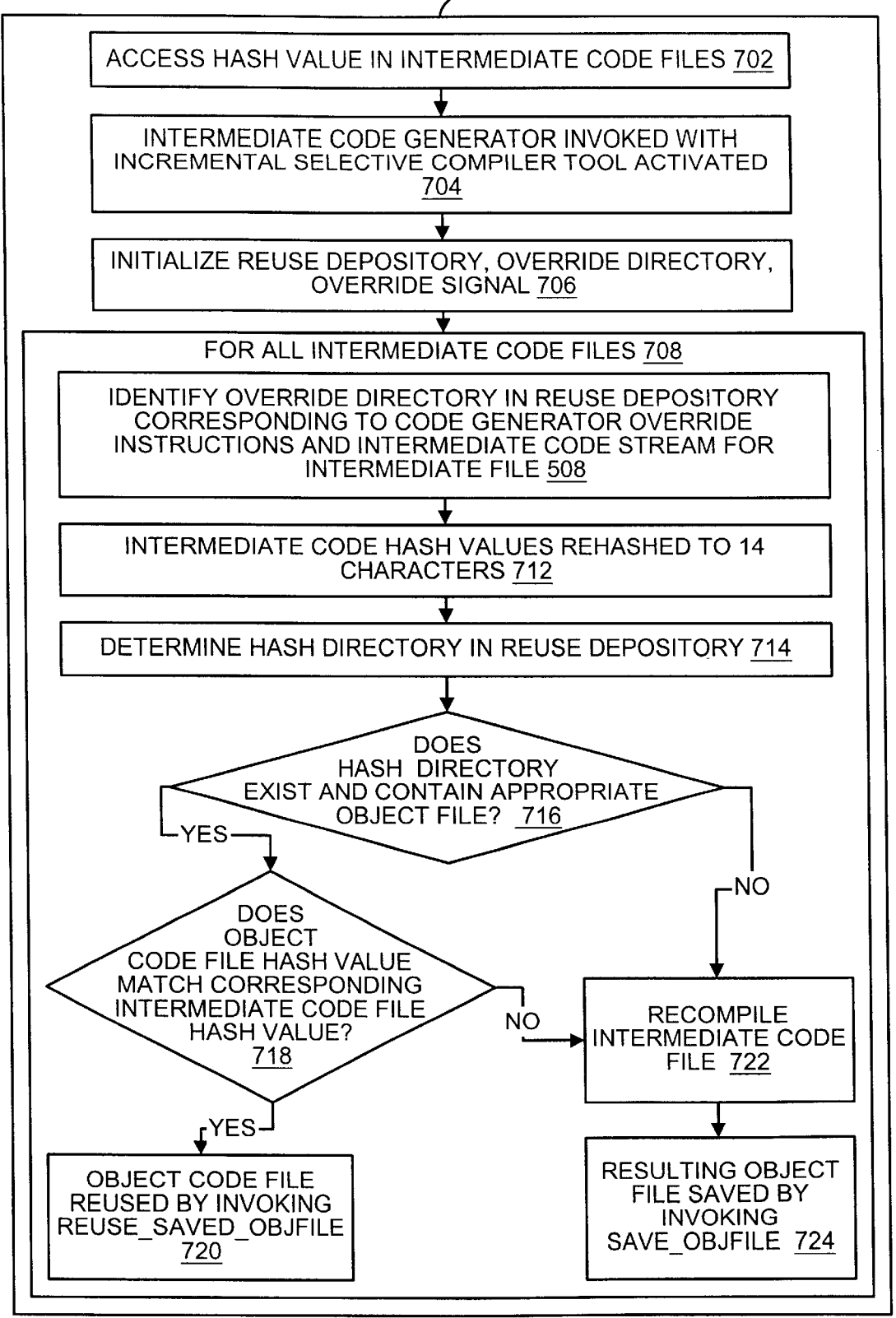
FIG. 7A is a flow chart that illustrates the detailed operation of the incremental selective compiler tool.

A detailed description of the compiler tool 102 as shown in FIG. 7A, includes accessing the hash value 206 in the intermediate code files 122 as shown in element 702. The intermediate code generator 113 is invoked with the compiler tool 102 activated, as shown in element 704. Recall that the path name of the reuse depository 208 is included when the compiler tool 102 is activated. Subsequently, the compiler tool 102 initializes data structures used in the operation of object file reuse, such as the reuse depository 208, the override directory 212, and the override signal 216 as shown in element 706.

The path name of the reuse depository 208 is the location of the reuse depository 208 and may be an absolute or relative path name. The override directory 212 name is a sub-directory of the reuse depository 208 (as are shown in FIG. 2). The override signal variable 216 contains the list of override instructions 210 (as are shown in FIG. 2) for this invocation of the intermediate code generator 113 (as shown in FIG. 1).

The process of locating the directory in the reuse depository 208 corresponding to the override instructions 210 for the intermediate code file 122 includes processing each intermediate code file 122, as shown in element 708. When the intermediate code generator 113 is invoked as shown in element 508 the override directory 212 that corresponds to the override instructions 210 is identified. Next the hash value 206 in the intermediate code file 122 is accessed and rehashed to fourteen characters as shown in element 712 thereby determining the hash directory 214 as shown in element 714.

If the hash directory 214 exists and an object file 120 of the appropriate name is located as shown in the testing element 716, the hash value 206 of the object file 120 is compared to the hash value 206 of the intermediate code file 122 as shown in element 718. It will be appreciated that elements 716 and 718 are discussed with reference to element 510 in FIG. 5. If there is a match then the object file is reused by invoking the reuse_saved_objfile 218 function as shown in element 720.

Figure 7B:
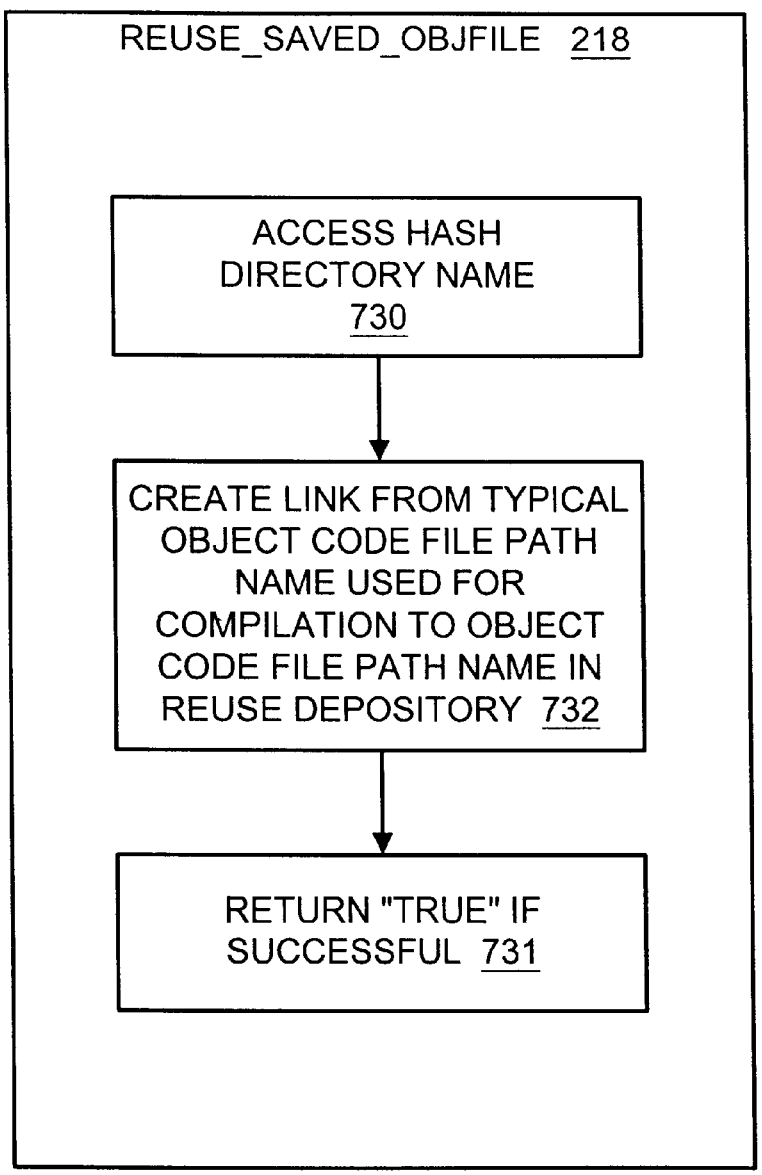
FIG. 7B is a flow chart that illustrates the reuse_save_ojbfile function.

As shown in FIG. 7B, the reuse_save_ojbfile function 218 is illustrated. Initially the path name of the hash directory 214 is accessed by performing a hash procedure on the hash value 206 in the object code file 120, as shown in element 730. Subsequently, a link from the typical path name used during compilation to access the object code file 120, is created to the path name of the hash directory 214 in the reuse depository 208 as shown in element 732. The reuse_saved_objfile 218 function returns a "TRUE" if the object file 120 is successfully reused as shown in element 731.

Returning to FIG. 7A and the test of element 718 in which a match between the hash value 206 of object code file 120 and the intermediate code file 122 is sought, if there is no match then the intermediate code file 122 is recompiled as shown in element 722. Further, the resulting object file 120 is saved by invoking the save_objfile function 220 as shown in element 724 and as described with regard to FIG. 7C. In the unlikely event of a hash collision, the most probable hash collision will be at the fourteen character hash directory 214. This will simply result in no match being found between the object file 120 and the intermediate file 122. Therefore, the result will be a possibly unnecessary recompilation of the intermediate file 122.

If the hash directory 214 does not exist and contain the appropriate object code file 120 the present embodiment recompiles the intermediate code file 122 as shown in element 722 and proceeds to element 724.

Figure 7C:
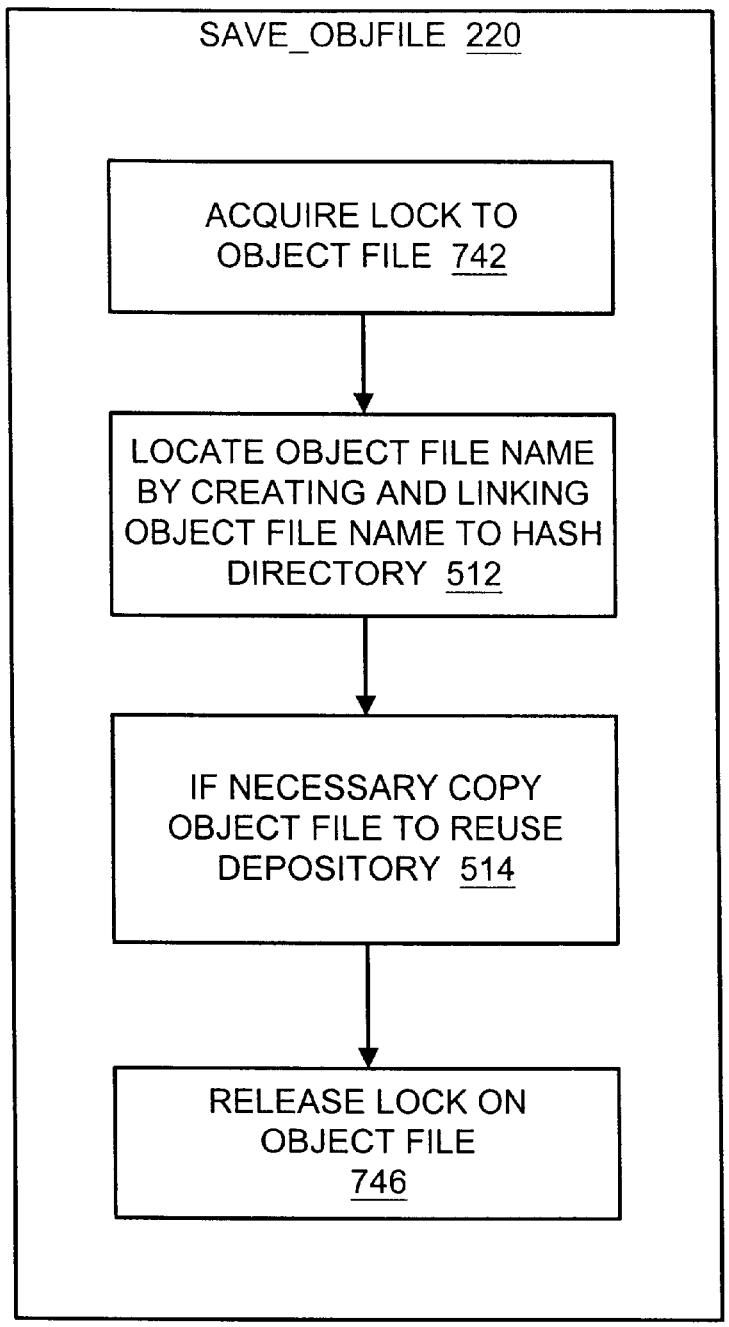
FIG. 7C is a flow chart that illustrates the save_objfile function.

FIG. 7C illustrates the save_objfile function 220 that is used to save the object file 120 for reuse by the compiler tool 102. The save_objfile function 220 acquires a lock to the object file 120 to prevent concurrent writes to the object file 120 as shown in element 742. The lock may be acquired by use of the lock file 224 (as shown in FIG. 2) that indicates whether the object file 120 is currently locked or unlocked. Recall that the object file 120 is copied to the hash directory 214 of the reuse depository 208 using a name constructed by the hash value 206 for the corresponding intermediate code file 122. Therefore the save_objfile function 220 locates the object file 120 by creating and linking the object file 120 to the hash directory 214, as shown in element 512. If necessary, the object file 120 is copied to the appropriate sub-directory in the reuse depository 208, that is the appropriate hash directory 214, as shown in element 514. For example, the object file 120 may need to be copied when the temporary file name is not in the same file system 116 (as shown in FIG. 1) as the reuse depository 208. Finally, the object file 120 is unlocked to allow further access to the file, as shown in element 746. Recall that elements 512 and 514 have been previously discussed with reference to FIG. 5. In the present embodiment, if an access to the lock file 224 fails, the linker 112 (as shown in FIG. 1) writes a warning message and terminates.

Figure 7D:
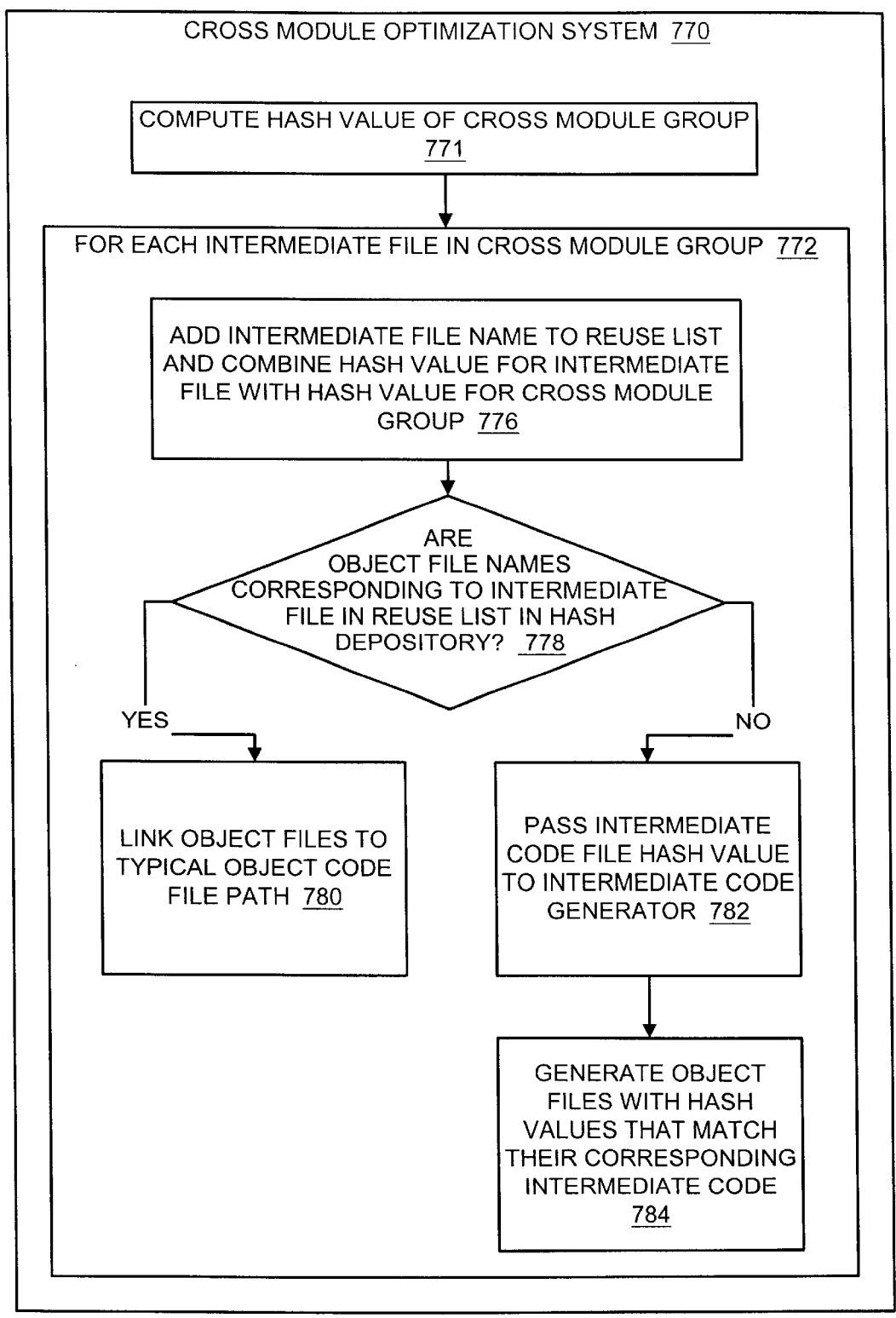
FIG. 7D is a flow chart that illustrates the cross module optimization system.

A cross module optimization system 770 is illustrated in FIG. 7D that treats intermediate files 122 as a unit, or cross module group 228, and does not keep track of optimization at the lowest file level. Therefore during cross module optimization, if one intermediate file 122 is changed then the cross module group 228 is treated by the compiler tool 102 as changed, and the intermediate files 122 associated with the cross module group 228 will be recompiled. By way of example, most compiler optimizers 109 (as shown in FIG. 1) include intermediate code systems to support cross module optimization systems 770 and optimization operations such as inlining procedures from one intermediate code file 122 into procedure calling instructions in another intermediate code file 122.

It will be appreciated that inlining is a transformation by the compilation system 108 that reduces resource overhead of the computer system 100 (as shown in FIG. 1) by replacing a call to a procedure with the body of the procedure. Therefore, inlining eliminates the jump to the location of the procedure and the return to the original calling procedure. That is, a call to a procedure represents a virtual location which is resolved to the actual location of the procedure that performs the operation included in the calling instruction. Therefore, eliminating the resolution of the virtual location address by including the operation in the calling procedure results in more efficient execution.

In the present embodiment, each intermediate code stream 202 in the cross module group 228 is hashed and the results are processed by the "XOR" instruction to produce a single hash value 206, independent of the order of the files in the cross module group 228 (as are shown in FIG. 2).

The hash value 206 of the cross module group 228 is computed as shown in element 771. Each intermediate file 122 in the cross module group 228 is processed as shown in element 772. The name of the intermediate code file 122 is added to a reuse list 230 with its own hash value 206 and combined with the hash value 206 of the cross module group 228 as shown in element 776. It will be appreciated that the reuse list 230 (as shown in FIG. 2) is maintained to facilitate the management of the compiler tool 102 (as shown in FIG. 1) for cross module groups 228. In the present embodiment, if the path names of the object code files 120 that correspond to the intermediate files 122 in the reuse list 230, are in the appropriate hash directory 214 as shown in the test in element 778; they are linked to the typical path name of the object code file 120 as shown in element 780, and the intermediate code files 122 in the cross module group 228 are not recompiled.

Otherwise, if the test in element 778 fails, the hash values 206 of intermediate code file 122 are passed to the intermediate code generator 113 as shown in element 782. Further, the resulting object files 120 are generated with hash values 206 that match their corresponding intermediate code files 122 as shown in element 784.

ALTERNATIVE EMBODIMENTS

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the compiler tool are presented for purposes of illustration and description. They are not intended to be exhaustive or to limit the invention to the precise forms disclosed, obviously many modifications and variations are possible in view of the above teachings. Those skilled in the art will recognize that changes may be made in form and detail without departing from the scope of the invention. The invention is limited only by the claims.

What is claimed is:

1. An incremental selective compiler tool for compilation of an intermediate code file; in a computer system having an object code file being compiled from said intermediate code file, a file system having a directory, and at least one instruction, comprising:

a first instruction being associated with said intermediate code file;

a first hash value hashed from said first instruction and associated with said intermediate code file;

a second instruction being associated with said object code file and with said compiled intermediate code file; and a second hash value hashed from said second instruction and associated with said object code file, said first hash value being compared with said second hash value, and said object code file being reused when said first hash value matches said second hash value for saving resources of said computer system.

2. The incremental selective compiler tool as set forth in claim 1, further comprising said intermediate code file being recompiled when a match is not found between said first hash value and said second hash value.

3. The incremental selective compiler tool as set forth in claim 1, further comprising said object code file being copied to said directory when said first hash value matches said second hash value, and correspondence being maintained between said copied object code file and said object code file.

4. The incremental selective compiler tool as set forth in claim 1, further comprising said object code file being linked to said directory when said first hash value matches said second hash value, and correspondence being maintained between said linked object code file and said object code file.

5. The incremental selective compiler tool as set forth in claim 1, further comprising:
    a first directive for compilation in said computer system being associated with said first instruction;
    said first hash value having said first directive that locates said intermediate code file in said directory;
    a second directive for compilation in said computer system being associated with said second instruction; and
    said second hash value having said second directive that locates said object code file in said directory.

6. The incremental selective compiler tool as set forth in claim 5, further comprising said first hash value identifying said intermediate code file in said directory when said intermediate code file is relocated within said file system.

7. The incremental selective compiler tool as set forth in claim 5, further comprising said second hash value locating said object code file in said directory when said object code file is relocated within said file system.

8. The incremental selective compiler tool as set forth in claim 5, further comprising said first hash value identifying said intermediate code file in said directory when said file system is relocated.

9. The incremental selective compiler tool as set forth in claim 5, further comprising said second hash value locating said object code file in said directory when said file system is relocated.

10. A method for incremental selective compiling, in a computer system having an intermediate code file, an object code file being compiled from said intermediate code file, a file system having a directory, and at least one instruction, comprising:
    associating a first instruction with said intermediate code file;
    hashing a first hash value from said first instruction and associating said first hash value with said intermediate code file;
    associating a second instruction with said object code file and said compiled intermediate code file; and
    hashing a second hash value from said second instruction, associating said second hash value with said object code file, comparing said first hash value with said second hash value, and reusing said object code file when said first hash value matches said second hash value for saving resources of said computer system.

11. The method as set forth in claim 10, further comprising recompiling said intermediate code file when a match is not found between said first hash value and said second hash value.

12. The method as set forth in claim 10, further comprising copying said object code file to said directory when said first hash value matches said second hash value, and maintaining correspondence between said copied object code file and said object code file.

13. The method as set forth in claim 10, further comprising linking said object code file to said directory when said first hash value matches said second hash value, and maintaining correspondence between said linked object code file and said object code file.

14. The method as set forth in claim 10, further comprising:
    associating a first directive with said first instruction for compilation in said computer system;
    locating said intermediate code file in said directory by accessing said first directive in said first hash value;
    associating a second directive with said second instruction for compilation in said computer system; and
    locating said object code file in said directory by accessing said second directive in said second hash value.

15. The method as set forth in claim 14, further comprising identifying said intermediate code file in said directory when said intermediate code file is relocated within said file system.

16. The method as set forth in claim 14, further comprising locating said object code file in said directory when said object code file is relocated within said file system.

17. The method as set forth in claim 14, further comprising identifying said intermediate code file in said directory when said file system is relocated.

18. The method as set forth in claim 14, further comprising locating said object code file in said directory when said file system is relocated.

19. An article of manufacture comprising a program storage medium having computer readable code embodied therein for incremental selective compiling; in a computer system having computer readable program code for an intermediate code file, for an object code file being compiled from said intermediate code file, for a file system having a directory, and for at least one instruction, said article of manufacture comprising:
    computer readable program code for associating a first instruction with said intermediate code file;
    computer readable program code for hashing a first hash value from said first instruction and associating said first hash value with said intermediate code file;
    computer readable code for associating a second instruction with said object code file and said compiled intermediate code file; and
    computer readable program code for hashing a second hash value from said second instruction, for associating said second hash value with said object code file, for comparing said first hash value with said second hash value, and for reusing said object code file when said first hash value matches said second hash value for saving resources of said computer system.

20. The article of manufacture set forth in claim 19, further comprising computer readable program code for recompiling said intermediate code file when a match is not found between said first hash value and said second hash value.

21. The article of manufacture set forth in claim 19, further comprising computer readable program code for copying said object code file to said directory when said first hash value matches said second hash value, and for maintaining correspondence between said copied object code file and said object code file.

22. The article of manufacture set forth in claim 19, further comprising computer readable program code for linking said object code file to said directory when said first hash value matches said second hash value, and for maintaining correspondence between said linked object code file and said object code file.

23. The article of manufacture set forth in claim 19, further comprising:

computer readable program code for associating a first directive with said first instruction for compilation in said computer system;

computer readable program code for locating said intermediate code file in said directory by accessing said first directive in said first hash value;

computer readable program code for associating a second directive with said second instruction for compilation in said computer system; and computer readable program code for locating said object code file in said directory by accessing said second directive in said second hash value.

24. A computer readable memory device encoded with a data structure having entries, for executing an incremental selective compiler tool for compilation of an intermediate code file entry; in a computer system having an object code file entry being compiled from said intermediate code file entry, a file system entry having a directory entry, and at least one instruction entry, said memory device comprising:

a first instruction entry being associated with said intermediate code file entry;

a first hash value entry hashed from said first instruction entry and associated with said intermediate code file entry;

a second instruction being associated with said object code file entry and with said compiled intermediate code file entry; and a second hash value entry hashed from said second instruction entry and associated with said object code file, said first hash value entry being compared with said second hash value entry, and said object code file entry being reused when said first hash value entry matches said second hash value entry for saving resources of said computer system.

25. The computer readable memory device as set forth in claim 24, further comprising said intermediate code file entry being recompiled when a match is not found between said first hash value entry and said second hash value entry.

26. The computer readable memory device as set forth in claim 24, further comprising:

a first directive entry for compilation in said computer system being associated with said first instruction entry;

said first hash value entry having said first directive entry that locates said intermediate code file entry in said directory entry;

a second directive entry for compilation in said computer system being associated with said second instruction entry; and said second hash value entry having said second directive entry that locates said object code file entry in said directory entry.

* * * * *